J. McGEORGE.
Belt-Fastener.

No. 223,598.  Patented Jan. 13, 1880.

Witnesses:
C Clarence Poole
L. W. Sully

Inventor:
James McGeorge
by Geo. W. Dyer Co.
Atty.

UNITED STATES PATENT OFFICE.

JAMES McGEORGE, OF BELLAIRE, OHIO, ASSIGNOR TO HIMSELF AND ALFRED L. BARON, OF SAME PLACE.

BELT-FASTENER.

SPECIFICATION forming part of Letters Patent No. 223,598, dated January 13, 1880.

Application filed October 29, 1879.

*To all whom it may concern:*

Be it known that I, JAMES McGEORGE, of Bellaire, in the county of Belmont and State of Ohio, have invented a new and useful Improvement in Belt-Fastenings; and I do hereby declare that the following is a full and exact description of the same, reference being had to the accompanying drawings, and to the letters of reference marked thereon.

The object of my invention is an improvement in fastenings for uniting the ends of rubber or leather belts, which can be made at much less cost than usual, will unite the ends of the belt more firmly and tightly together, can be applied or removed more rapidly, will offer no obstruction to the running of the belts over pulleys or drums, and will be very simple as well as durable in construction.

My invention therein consists in the peculiar construction of the sheet-metal fastenings used for the above purpose, as fully hereinafter explained.

Figure 1:
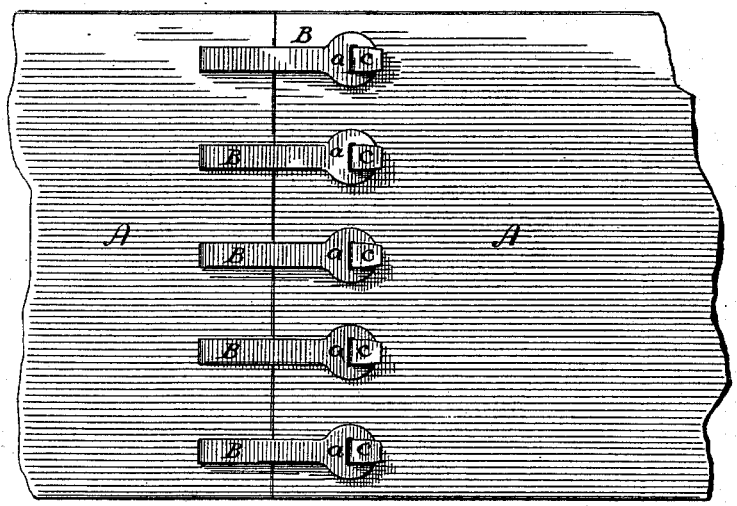
Figure 2:
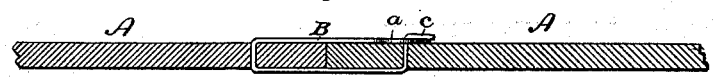
Figure 3:
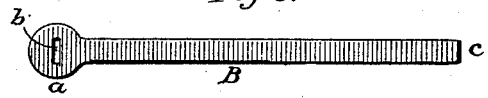

In the accompanying drawings, Figure 1 represents a view of the under side of a belt united by my fastenings; Fig. 2, a longitudinal section through one of the fastenings, and Fig. 3 a separate view of the fastening as it is stamped out.

Like letters refer to corresponding parts.

A A represent a leather or rubber belt of ordinary construction, the ends of which are to be united by my fastenings. B is the fastening. (Shown more particularly in Fig. 3.) This fastening is stamped out of sheet metal, ordinary stout tin being very suitable, and has at one end an enlarged portion, *a*, with a slot, *b*, of sufficient width to admit the small end or tongue of the fastening. They can be made very cheaply by stamping them out of sheet metal with a proper die, and small pieces of metal may be thus utilized which would otherwise be thrown away.

The ends of the belt A, which are to be joined by the fastener, are brought together, and slots *c*, of a width to admit the narrow portion of the fastening, punched therein. These slots being punched opposite one another, the small end of a fastening is inserted in one of the slots from below, then carried over and pushed through the opposite slot from above, and then inserted in the slot *b* in the enlarged end of the fastening. It is then bent over, as shown in Fig. 2, securely locking the ends together, and can be applied readily by the hand without the use of a hammer or other instrument.

The fastening, it will be seen, is made with parallel sides, so as to be of equal strength throughout, which is quite essential in a pulley-belt fastener.

The securing end of the fastener, after being passed through the slot of the enlarged end, is turned outwardly, so that it will not be pulled through the slot in use, and the fastener is of such length that this small end will extend beyond the edge of the enlarged end, and can be bent down over this edge to make the fastening more secure. If the belt is used with the ends of the fastening on the inside, the pressure against the faces of the pulleys will bend this small end down; or if the ends of the fastener are placed outwardly, the small end will be bent over the edge of the enlarged end before the belt is put in use.

Any number of fastenings may be used, according to the width of the belt.

As thus used my self-locking fastening will be found much more convenient than the complicated metallic fasteners or strings hitherto employed. They will be as durable and efficient, and the cost of manufacture will be much reduced.

What I claim as new, and desire to secure by Letters Patent, is—

As an improved article of manufacture, the fastener B, adapted for holding together the meeting ends of a pulley-belt, constructed of sheet metal, with parallel sides, and with an enlarged end, *a*, having slot *b*, substantially as described and shown.

This specification signed and witnessed this 3d day of October, 1878.

JAMES McGEORGE.

Witnesses:
CHAS. C. CRATTY,
D. RANKIN.